(12) United States Patent
Thyagarajan et al.

(10) Patent No.: US 11,055,098 B2
(45) Date of Patent: Jul. 6, 2021

(54) BRANCH TARGET BUFFER WITH EARLY RETURN PREDICTION

(71) Applicant: ADVANCED MICRO DEVICES, INC., Santa Clara, CA (US)

(72) Inventors: Aparna Thyagarajan, Santa Clara, CA (US); Marius Evers, Santa Clara, CA (US); Arunachalam Annamalai, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/043,293

(22) Filed: Jul. 24, 2018

(65) Prior Publication Data

US 2020/0034151 A1   Jan. 30, 2020

(51) Int. Cl.
  *G06F 9/38*   (2018.01)
  *G06F 9/30*   (2018.01)

(52) U.S. Cl.
  CPC ........ *G06F 9/3806* (2013.01); *G06F 9/30058* (2013.01)

(58) Field of Classification Search
  None
  See application file for complete search history.

(56) References Cited

U.S. PATENT DOCUMENTS

| | | | | |
|---|---|---|---|---|
| 5,604,877 A | * | 2/1997 | Hoyt | G06F 9/3806 712/243 |
| 5,768,576 A | * | 6/1998 | Hoyt | G06F 9/3806 712/238 |
| 5,850,543 A | * | 12/1998 | Shiell | G06F 9/3806 712/238 |
| 5,964,868 A | * | 10/1999 | Gochman | G06F 9/3806 712/230 |
| 6,609,194 B1 | * | 8/2003 | Henry | G06F 9/322 711/213 |

(Continued)

FOREIGN PATENT DOCUMENTS

GB   WO2019162647 A1 *   8/2019

OTHER PUBLICATIONS

International Search Report and Written Opinion dated Oct. 25, 2019 for International Application No. PCT/US2019/042176, 11 pages.

(Continued)

*Primary Examiner* — Steven G Snyder

(57) ABSTRACT

A processor includes a branch target buffer (BTB) having a plurality of entries whereby each entry corresponds to an associated instruction pointer value that is predicted to be a branch instruction. Each BTB entry stores a predicted branch target address for the branch instruction, and further stores information indicating whether the next branch in the block of instructions associated with the predicted branch target address is predicted to be a return instruction. In response to the BTB indicating that the next branch is predicted to be a return instruction, the processor initiates an access to a return stack that stores the return address for the predicted return instruction. By initiating access to the return stack responsive to the return prediction stored at the BTB, the processor reduces the delay in identifying the return address, thereby improving processing efficiency.

20 Claims, 3 Drawing Sheets

(56) References Cited

U.S. PATENT DOCUMENTS

| | | | | |
|---|---|---|---|---|
| 6,957,327 | B1* | 10/2005 | Gelman | G06F 9/3844 |
| | | | | 712/238 |
| 6,973,563 | B1 | 12/2005 | Sander | |
| 7,200,740 | B2* | 4/2007 | Henry | G06F 9/3806 |
| | | | | 712/239 |
| 7,882,338 | B2* | 2/2011 | Alexander | G06F 9/30054 |
| | | | | 712/242 |
| 7,913,068 | B2* | 3/2011 | Bonanno | G06F 9/30145 |
| | | | | 712/238 |
| 9,395,994 | B2* | 7/2016 | Jiang | G06F 9/3806 |
| 2003/0120906 | A1 | 6/2003 | Jourdan et al. | |
| 2004/0003213 | A1 | 1/2004 | Bockhaus et al. | |
| 2009/0210661 | A1* | 8/2009 | Alexander | G06F 9/30054 |
| | | | | 712/206 |
| 2009/0217002 | A1* | 8/2009 | Bonanno | G06F 9/30145 |
| | | | | 712/205 |
| 2012/0079255 | A1 | 3/2012 | Combs et al. | |
| 2012/0297167 | A1 | 11/2012 | Shah et al. | |
| 2014/0019736 | A1* | 1/2014 | Jiang | G06F 9/3806 |
| | | | | 712/237 |
| 2014/0250289 | A1* | 9/2014 | Pota | G06F 9/3867 |
| | | | | 712/240 |
| 2018/0060075 | A1 | 3/2018 | Chou et al. | |
| 2019/0235873 | A1* | 8/2019 | Dundas | G06F 12/0875 |
| 2020/0081717 | A1* | 3/2020 | Orion | G06F 9/3806 |

OTHER PUBLICATIONS

International Preliminary Report on Patentability for International Application No. PCT/US2019/042176 dated Feb. 4, 2021, 8 pages.

* cited by examiner

BRANCH TARGET BUFFER WITH EARLY RETURN PREDICTION

BACKGROUND

To increase processing efficiency, a processor can employ one or more predictive processing techniques. One type of predictive processing technique is referred to as branch prediction, whereby the processor predicts the outcome of a branch instruction so that the processor can begin speculatively executing subsequent instructions along the predicted branch before the processing unit has evaluated the branch instruction. To further enhance processing efficiency, the processor employs a branch target structure, referred to as a branch target buffer (BTB). The BTB stores address information for predicted branches. However, conventional BTB structures do not support efficient execution of different types of program branches.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
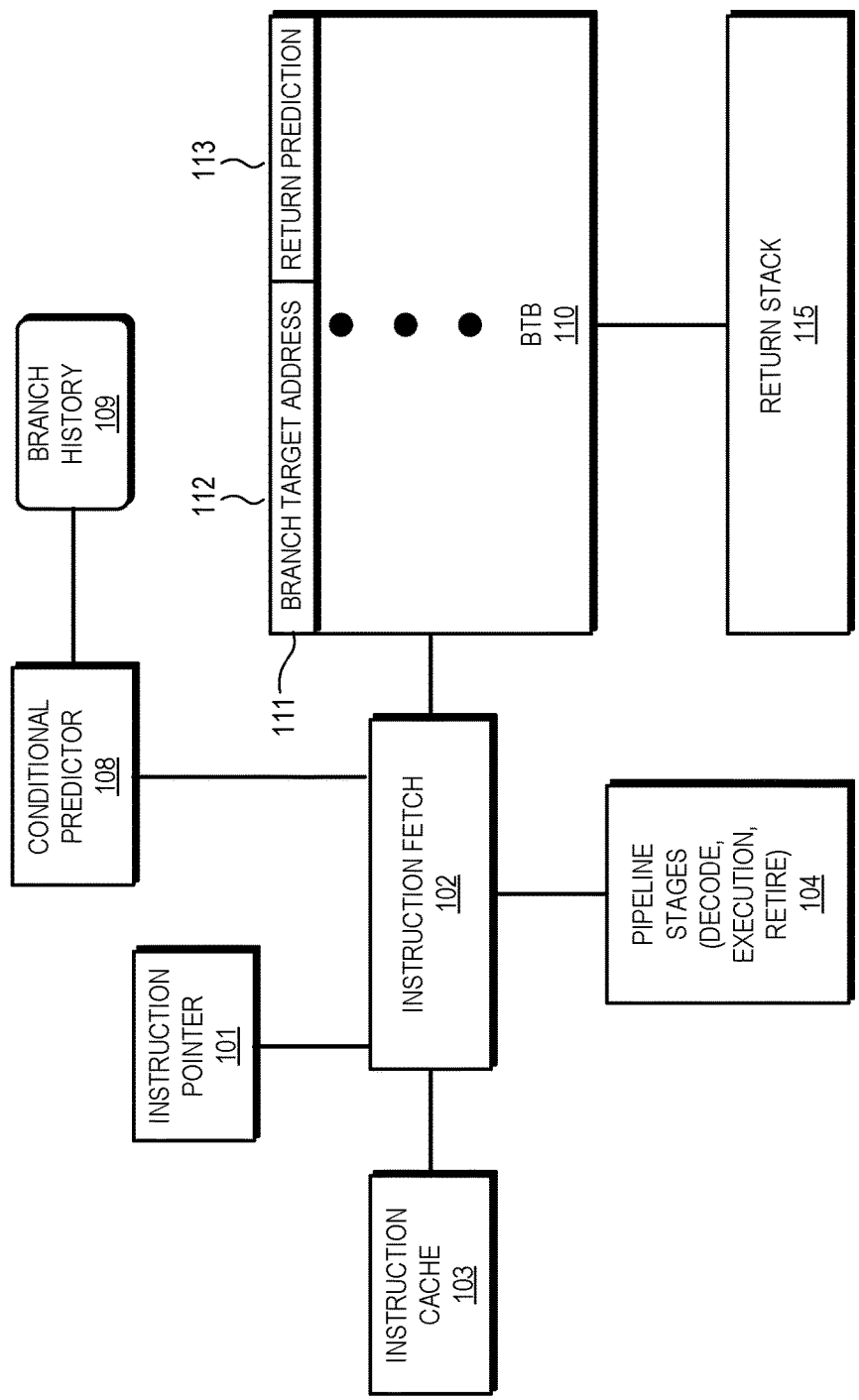
FIG. 1 is a block diagram of a processor that employs a branch target buffer (BTB) that includes return prediction information to predict whether an instruction block targeted by a branch instruction includes a return instruction in accordance with some embodiments.
Figure 2:
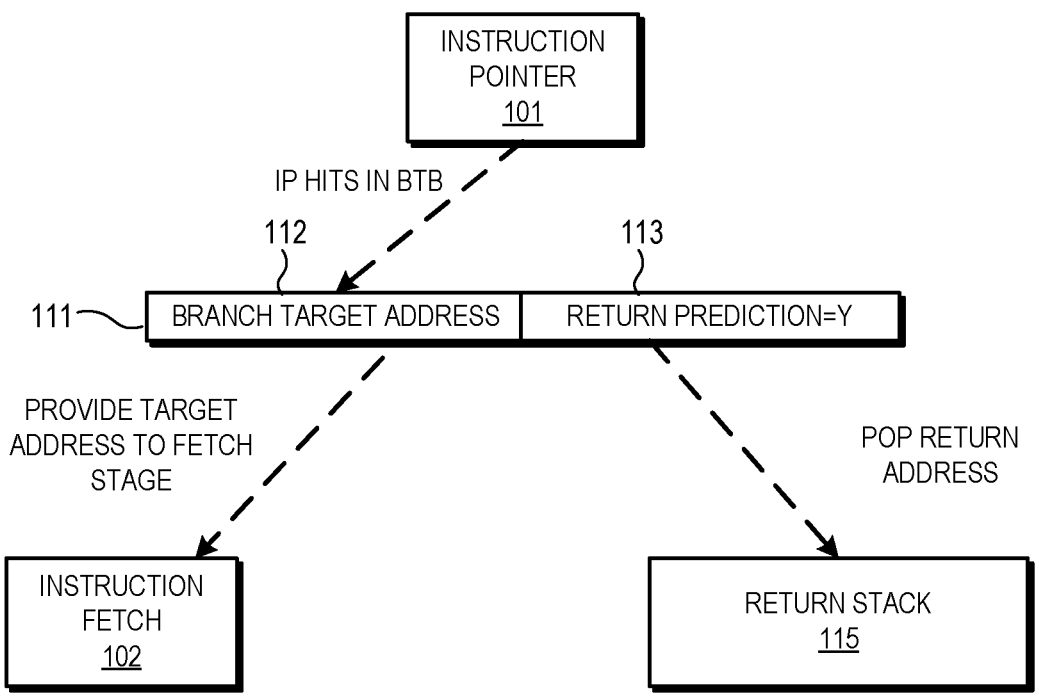
FIG. 2 is a diagram of an example of the processor of FIG. 1 initiating access to stack of return addresses in response to the BTB indicating that an instruction block targeted by a branch instruction includes a return instruction in accordance with some embodiments.
Figure 3:
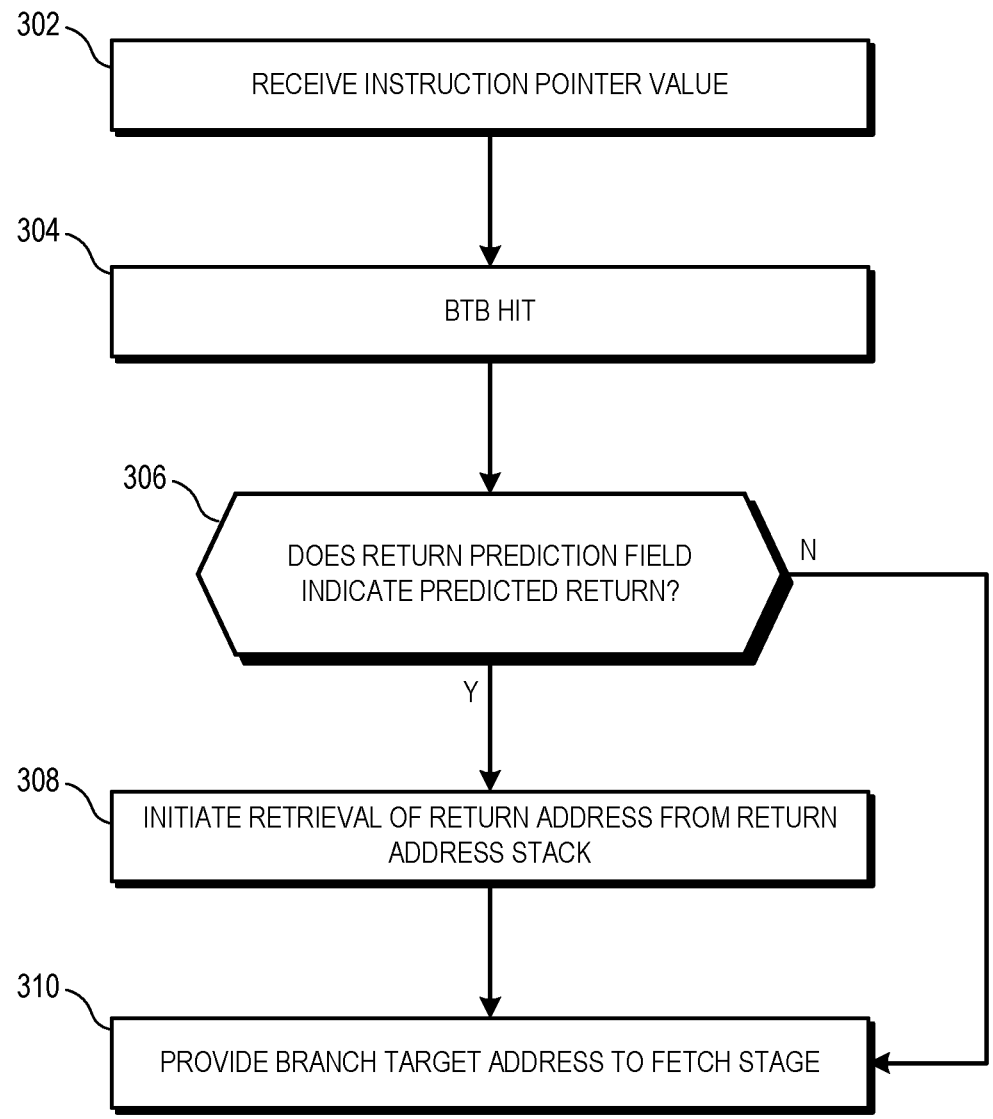
FIG. 3 is a flow diagram of a method of a processor initiating access to stack of return addresses in response to a BTB indicating that an instruction block targeted by a branch instruction includes a return instruction in accordance with some embodiments.

FIGS. 1-3 illustrate techniques for reducing delays in identifying a return address for a return instruction at a processor. The processor includes a branch target buffer (BTB) having a plurality of entries whereby each entry corresponds to an associated instruction pointer value that is predicted to be a branch instruction. Each BTB entry stores a predicted branch target address for the branch instruction, and further stores information indicating whether the next branch in the block of instructions associated with the predicted branch target address is predicted to be a return instruction. In response to the BTB indicating that the next branch is predicted to be a return instruction, the processor initiates an access to a return stack that stores the return address for the predicted return instruction. By initiating access to the return stack responsive to the return prediction stored at the BTB, the processor reduces the delay in identifying the return address, thereby improving processing efficiency.

In contrast to the techniques described herein, a conventional processor does not store predicted return information. Thus, a conventional processor does not initiate access to the return stack until a fetch stage of the processor identifies that the current instruction pointer value corresponds to a return instruction. Because retrieving the return address from the return stack requires multiple clock cycles, operations at the processor can be delayed. Using the techniques described herein, the processor initiates access to the return stack early, so that when the instruction pointer value reaches the return instruction, the return address has been retrieved from the stack and is available for use by the processor. Thus, storing predicted return information supports faster access to return addresses and thus improves processing efficiency.

FIG. 1 illustrates a processor 100 that employs a branch target buffer (BTB) that includes return prediction information to predict whether an instruction block targeted by a branch instruction includes a return instruction in accordance with some embodiments. The processor executes sets of instructions (e.g., computer programs) to carry out specified tasks on behalf of an electronic device. In some embodiments, the processor 100 is incorporated in one of a variety of electronic devices, such as a desktop or laptop computer, server, game console, smartphone, tablet, and the like.

To support execution of instructions, the processor 100 includes an instruction pipeline having an instruction fetch stage 102 and additional pipeline stages 104. The additional pipeline stages 104 include stages to decode fetched instructions into sets of operations, execution stages to execute the decoded operations, and a retire stage to retire executed instructions. It will be appreciated that in some embodiments the processor 100 includes additional modules to support execution of instructions, including one or more memory controllers, input/output controllers, memory structures (e.g., one or more caches) and the like. In addition, it will be appreciated that in some embodiments the processor 100 includes additional instruction pipelines. For example, in some embodiments the processor 100 includes multiple processor cores, with each processor core having at least one instruction pipeline to execute sets of instructions. Moreover, in some embodiments the processor 100 includes additional processing units specifically designed to execute operations associated with special tasks, such as one or more graphics processing units (GPUs) to execute operations associated with drawing, display, and other graphics operations.

Returning to the illustrated embodiment of FIG. 1, the instruction fetch stage 102 is generally configured to retrieve (fetch) instructions from an instruction cache 103 based on an instruction pointer 101. As will be appreciated by one skilled in the art, the instructions pointer 101 is an address value indicating the current instruction to be fetched and can be modified by executing operations to modify the program flow of the instructions being executed. For example, in some embodiments branch instructions modify the instruction pointer 101 based, for example, on evaluation of data specified by the branch instruction or an associated instruction.

To support efficient execution of branch instructions, the processor 100 includes a return stack 115 and branch target buffer (BTB) 110. The return stack 115 is a stack memory structure that stores return addresses for return instructions executing at the processor 100. In operation, in response to identifying a branch instruction that is of type call, the fetch stage 102 generates a specified instruction pointer value as the return address. In some embodiments, the instruction fetch stage 102 generates the return address by adding a specified value to the instruction pointer 101, wherein the specified value corresponds to a size (e.g., a width) of the instructions executed at the instruction pipeline. The instruction fetch stage pushes the return address on the return stack 115. For a return instruction, the fetch stage 102 identifies the return address by retrieving (popping) the return address from the top of the return stack 115, as described further herein, and storing the return address as the value of the instruction pointer 101.

The BTB 110 includes a plurality of entries (e.g., entry 111) with each entry corresponding to a different instruction pointer value that is associated with a branch instruction. Each instruction cycle, the instruction fetch stage 102 provides the instruction pointer 101 to the BTB 110. In response to identifying that an entry corresponds to the received instruction pointer value (referred to as a BTB hit) the BTB 110 retrieves a branch target address (BTA) from a BTA field (e.g., BTA field 112 of entry 111) of the identified entry and provides the BTA to the instruction fetch stage 102. The BTB 110 thus provides an efficient way for the processor 100 to quickly identify branch target addresses.

In some embodiments, the processor can modify the entries of the BTB 110, including allocation of new entries and modification of BTAs, both non-speculatively and speculatively. Non-speculative updates are executed by the pipeline stages 104. For example, in response to identifying an instruction as a branch instruction, a decode stage provides an instruction pointer value for the branch instruction to the BTB 110. In response, the BTB 110 ensures that an entry is allocated for the received instruction pointer value. In addition, an execution unit provides the calculated BTA for the branch instruction to the BTB 110, which stores the BTA at the BTA field of the corresponding entry.

To further support branch prediction, the processor 100 includes a conditional predictor 108. The conditional predictor 108 monitors the history of branch instructions (illustrated as branch history 109) executed at the instruction pipeline of the processor 100, and identifies patterns in branch history 109 according to one or more known branch prediction techniques. Based on the identified patterns and on the actual direction of each branch, the conditional predictor 108 predicts whether each branch instruction is taken or not taken (sometimes referred to as the direction of the branch instruction).

Returning to the BTB 110, in addition to stored BTAs, each entry includes a return prediction field (e.g. return prediction field 113) to indicate if the next branch instruction in the block of instructions associated with the corresponding BTA is predicted to be a return instruction. For ease of description, such a sequence is referred to herein as a "branch-return" sequence, with the branch instruction that begins the sequence referred to as the "source" branch of the branch-return sequence. An example of such a sequence is as follows:

| JMP ADDRESS A | (source branch instruction) |
| LD X, DATA1 | (Load value to register X) |
| ADD X, Y | (Add values at register X and register Y) |
| RETURN | |

In contrast, the following is an example of a sequence wherein a return instruction is not the next branch instruction following the given branch instruction (and is therefore not a branch-return sequence):

| JMP ADDRESS A | (branch instruction) |
| LD X, DATA1 | (Load value to register X) |
| ADD X, Y | (Add values at register X and register Y) |
| JMP ADDRESS B | (branch instruction-not a branch return sequence) |

In response to identifying a branch-return sequence a threshold number of times, the BTB 110 sets the return prediction field to indicate a predicted return. In response to receiving an instruction pointer value from the instruction fetch stage 102, the BTB 110 determines if the received instruction pointer value results in a BTB hit, as described above. In response to a BTB hit, the BTB 110 provides to the instruction fetch stage 102 the BTA at the BTA field of the entry that caused the BTB hit. In addition, the BTB 110 determines if the corresponding return prediction field indicates a predicted return. If so, the BTB 110 initiates a pop operation at the return stack 115. The return address is therefore available for quick access when the predicted return instruction is reached.

In the event that the next branch instruction in the program flow is not a return instruction, one or more of the pipeline stages 104 indicates to the BTB 110 a mis-predicted return. In some embodiments, in response to a mis-predicted return, the BTB 110 clears the return prediction field for the entry corresponding to the source branch instruction of the branch return sequence. In other embodiments, the BTB 110 clears the return prediction field in response to the mis-predicted return occurring a threshold number of times.

In some embodiments, in addition to initiating access to the return stack 115, the processor 100 takes additional actions in response to a predicted return. For example, in some embodiments, in response to a predicted return the processor 100 suppresses the subsequent access to the BTB 110 that is expected to result in a BTB hit on the predicted return instruction itself. By suppressing this access, the processor 100 conserves power and other system resources.

FIG. 2 is a diagram of an example 200 of the processor 100 initiating access to the return stack 115 in response to the BTB 110 indicating that an instruction block targeted by a branch instruction includes a return instruction in accordance with some embodiments. In the example 200, the entry 111 includes the BTA field 112 to store a BTA for the branch instruction corresponding to the entry 111. In addition, the return prediction field 113 of entry 111 is set to value (indicated as "Y" in the depicted example) that indicates the branch instruction is predicted to be the branch source of a branch-return sequence. That is, the return prediction field 113 is in a state indicating that the next branch instruction in the block of instructions associated with the branch instruction corresponding to entry 111 is predicted to be a return instruction. For ease of description, this state is referred to herein as the return prediction field indicating a predicted return.

For example 200, the instruction fetch stage 102 provides the instruction pointer 101 to the BTB 110. The provision of the instruction pointer 101 results in a BTB hit at the entry 111. That is, the BTB 110 identifies the entry 111 as being associated with the memory address corresponding to the instruction pointer 101. In response to the BTB hit, the BTB 110 provides the BTA stored at the BTA field 112 to the instruction fetch stage 102. In addition, responsive to the return prediction field 113 indicating a predicted return, the BTB 110 initiates an access to the return stack 115 to retrieve (pop) the address at the top of the stack, for provision to the instruction fetch stage 102.

FIG. 3 is a flow diagram of a method 300 of a processor initiating access to stack of return addresses in response to a BTB indicating that an instruction block targeted by a branch instruction includes a return instruction in accordance with some embodiments. At block 302, the BTB receives an instruction pointer value from a fetch stage of the processor. At block 304 the BTB identifies an entry corresponding to the received instruction pointer. At block 306, the BTB identifies whether a return prediction field of the identified entry indicates a predicted return. If not, the method flow moves to block 310 and the BTB provides a BTA at the identified BTB entry to the fetch stage.

If, at block 306, the BTB identifies that a return prediction field of the identified entry does indicate a predicted return, the method flow moves to block 308 and the BTB initiates retrieval of the return address from the top of the return stack. The method flow proceeds to block 310 and the BTB provides a BTA at the identified BTB entry to the fetch stage.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying, in response to a first branch instruction and based on a first entry of a branch target buffer (BTB) of a processor, a prediction of a first branch return instruction, the first branch return instruction different from the first branch instruction; and
   in response to identifying the prediction of the first branch return instruction, initiating access to a stack of branch return addresses of the processor to retrieve an address for provision to an instruction fetch stage of the processor.

2. The method of claim 1, wherein the first entry comprises:
   a first return field indicating the prediction of the first branch return instruction; and
   a first branch field indicating a first predicted branch address.

3. The method of claim 2, wherein the prediction of the first branch return instruction comprises a prediction that the first predicted branch address corresponds to a return instruction.

4. The method of claim 3, further comprising setting the first entry to indicate no return prediction in response to identifying that the first branch return instruction was mispredicted.

5. The method of claim 1, further comprising:
   in response to determining that the first entry indicates a prediction of a return instruction, suppressing a subsequent access to the BTB.

6. The method of claim 1, further comprising:
   identifying, based on a second entry of the BTB, a prediction of a second branch return instruction; and
   in response to identifying the prediction of the second branch return instruction, initiating access to the stack of branch return addresses.

7. A method, comprising:
   accessing a first entry of a branch target buffer (BTB) based on a first program counter value corresponding to a first branch instruction;
   branching to a first instruction address based on a first branch address field of the first entry of the BTB; and
   in response to a first return field of the first entry of the BTB indicating that the first instruction address corresponds to a return instruction different from the first branch instruction, initiating access to a stack of branch return addresses to retrieve an address for provision to an instruction fetch stage of a processor.

8. The method of claim 7, further comprising:
   in response to determining that the first instruction address corresponds to the return instruction, storing an indication of a return at the first return field.

9. The method of claim 7, wherein initiating access to the stack of branch return addresses comprises returning an instruction address from the stack of branch return addresses concurrent with branching to the first instruction address.

10. The method of claim 7, further comprising:
in response to the first return field indicating that the first instruction address corresponds to the return instruction, suppressing a subsequent access to the BTB.

11. The method of claim 10, wherein suppressing the subsequent access comprises suppressing an access to the BTB that is expected to result in a BTB hit on a predicted return instruction.

12. The method of claim 7, further comprising:
accessing a second entry of the BTB based on a second program counter value;
branching to a second instruction address based on a second branch address field of the first entry of the BTB; and
in response to a second return field of the second entry of the BTB indicating that the second instruction address corresponds to a return instruction, initiating access to the stack of branch return addresses.

13. The method of claim 7, further comprising:
setting the first entry to indicate no return prediction in response to identifying that the return instruction was mispredicted.

14. A processor, comprising:
a branch target buffer (BTB) comprising a first entry identifying a prediction of a first branch return instruction, the first entry associated with a first branch instruction different than the first branch return instruction;
a stack of branch return addresses; and
a processor core configured to, in response to the first entry of the BTB indicating the prediction of the first branch return instruction, initiating access to the stack of branch return addresses to retrieve an address for provision to an instruction fetch stage of the processor.

15. The processor of claim 14, wherein the first entry of the BTB comprises:
a first return field indicating the prediction of the first branch return instruction; and
a first branch field indicating a first predicted branch address.

16. The processor of claim 15, wherein the prediction of the first branch return instruction comprises a prediction that the first predicted branch address corresponds to a return instruction.

17. The processor of claim 15, wherein the processor core is configured to:
set the first entry to indicate no return prediction in response to identifying that the first branch return instruction was mispredicted.

18. The processor of claim 14, wherein the processor core is configured to:
in response to determining that the first entry indicates a return instruction, suppress a subsequent access to the BTB.

19. The processor of claim 14, wherein the processor core is configured to:
in response to determining that the first entry indicates a return instruction, suppress a subsequent access to the BTB that is expected to access the first branch return instruction.

20. The processor of claim 14, wherein:
the BTB comprises a second entry indicating a prediction of a second branch return instruction; and
the processor core is configured to, in response to identifying the prediction of the second branch return instruction, initiate access to the stack of branch return addresses.

* * * * *